March 28, 1961     E. C. CREUTZ     2,976,598
METHOD OF SINTERING
Filed April 30, 1959
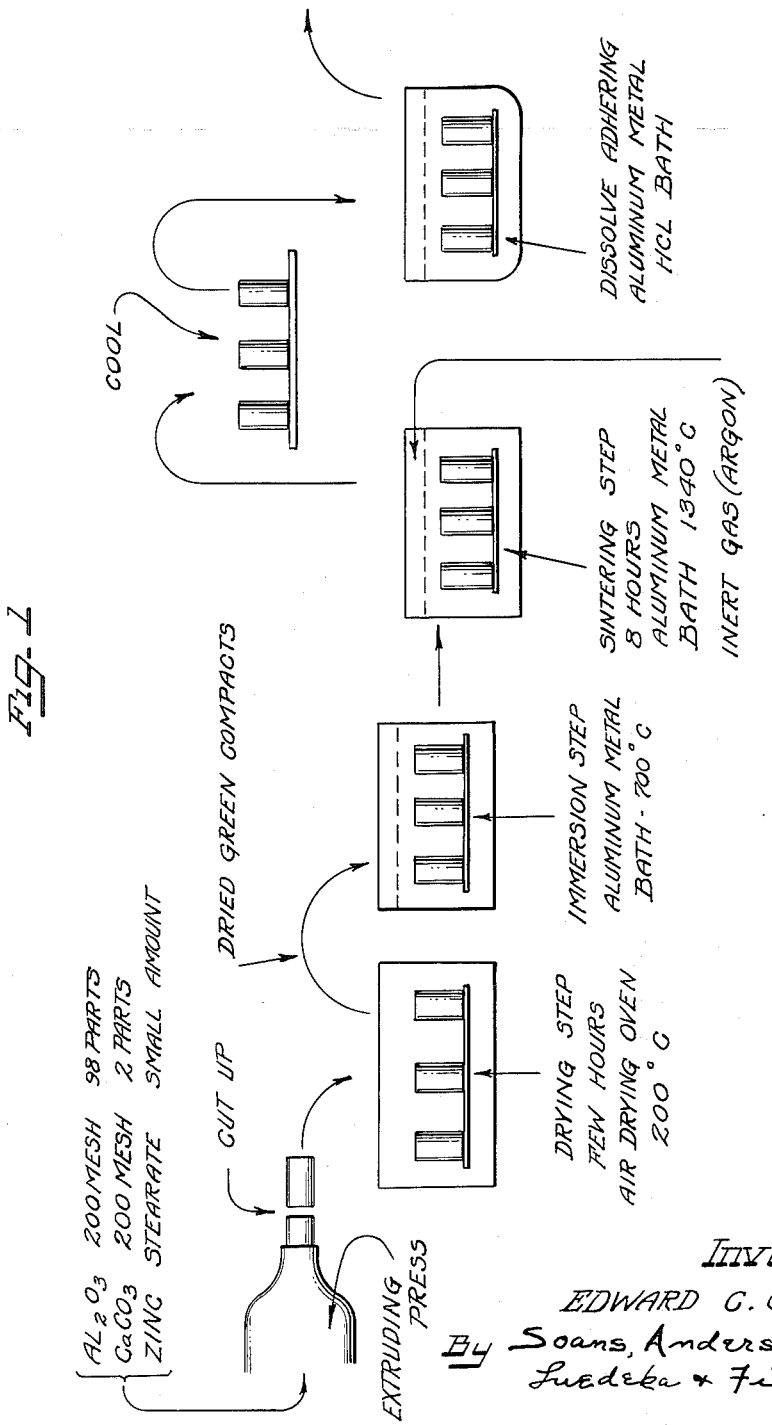
Inventor
EDWARD C. CREUTZ
By Soans, Anderson,
Luedeka & Fitch
Attys :::
United States Patent Office 2,976,598
Patented Mar. 28, 1961

2,976,598

METHOD OF SINTERING

Edward C. Creutz, Rancho Santa Fe, Calif., assignor to General Dynamics Corporation, New York, N.Y., a corporation of Delaware Filed Apr. 30, 1959, Ser. No. 809,930

5 Claims. (Cl. 25—157)

This invention relates to a method of sintering particles of material to form integrated articles or masses capable of various uses, especially where the desired shape or dimensional accuracy of the finished, sintered article may be of importance.

Ceramic objects or products are usually made by a process which involves preparing a plastic mass of a sinterable material of small particle size such as a clay or clay-like material, usually by addition of a binder, with or without water or other compatible fluid or blending agent, then working the mass into a desired shape, then drying the shaped mass so as to drive off part of the volatile components and form a "green" compact which can be handled without significant damage, and then "firing" it at a high enough temperature to sinter the particles of the mass so as to obtain a stable, rigid product.

The common and traditional method of making ceramic products, as above outlined, may vary greatly in its details. For example, various types of adhesive binders may be used to hold the unfired compacts together. Also, the character of the finished product will naturally depend upon the various ingredients and the proportions in which they are used, as well as upon the temperature and conditions under which the firing step is performed. Some ceramic products may be rather porous or water-absorptive, while others are relatively hard and impermeable.

In the case of most ceramic articles, the firing of the green formed shapes or compacts is carried on at a high enough temperature, for a sufficient length of time, and under such conditions, that the particles of the mass are united together to produce a stabilized product which, under normal conditions, will permanently maintain the characteristics which it had when it left the firing kiln.

Although the ceramic art is one of the first arts practiced by mankind, the firing step of the traditional process has often involved the problem of producing a finished article which will have the same shape and dimensions as those existing before the firing step. Small variations in the dimensions of a finished ceramic product may not be of serious importance for many conventional uses, but may result in the discarding of a large percentage of the finished product in the case of articles intended to be used for, or as components of, structures of a scientific character where even a very slight discrepancy in size or distortion in shape, may render the article unfit for its intended purpose.

The invention herein disclosed deals with the problem of producing sintered or ceramic articles of a designed shape with small distortion in shape or size due to the firing step, and without any significant percentage of rejects due to distortion or improper dimensions.

An important aspect of the invention resides in the discovery that partial collapse of the molded mass, generally accompanied by distortion of its initial molded shape, appears to be caused by the fact during the sintering step, and before the sintering has arrived at a certain stage, the crushing strength or cohering properties of the unsintered mass is, or becomes, insufficient to enable the unsintered mass to fully support itself, causing a partial collapse of the mass under the force of gravity, and also some shrinkage.

In accordance with this invention, the formed shapes, during the sintering step, instead of being freely exposed to the air or other gaseous medium or a vacuum during the firing step, are immersed in, or surrounded by, a bath of a liquid substance which is relatively inert or unreactive to the mass during the firing step, and which substance is capable of being liquefied at a temperature which is below the temperature at which the sintering of the mass occurs. Also, this liquid, at the sintering temperature, preferably should be of such specific gravity that the article to be sintered will not float in the bath. In other words, it is desirable that the bath should have a somewhat lower specific gravity than the mass, so that the article being sintered will rest upon the bottom of the crucible or tank in which the bath is contained.

The principal component of certain ceramic mixes is alumina, $Al_2O_3$, or a compound thereof, and the lowest temperature at which the sintering of alumina is usually effected is at about 1600° C., whereas the melting point of alumina is about 2020° C. An extruded compact of a ceramic mix containing alumina as its principal ingredient and dried ready for firing has an apparent specific gravity of about 2.75, so that it is desirable to use a bath of molten material having a density preferably a little below 2.75 and capable of being liquid at a temperature substantially lower than the sintering temperature which may be about 1340° C. The material which has been found to be most useful for this purpose is a metallic substance such as aluminum which has a melting point of 658° C., and which, when at a temperature of about 1200° C. has a specific gravity of less than 2.70. Molten aluminum has the property of "wetting" the surface of the objects during the sintering operation. This property may be of value in preventing escape of vacancies, thus preventing a contraction in the size of the object. If insufficient support is supplied by a metal of such low specific gravity as aluminum, its specific gravity may be increased by alloying it with another suitable metal such as copper which has a specific gravity greater than that of aluminum. However, as previously stated, the specific gravity of the bath should preferably not exceed that of the mass—otherwise the mass may not be fully immersed in the bath.

A preferred embodiment of a process which has been successfully employed is shown in the attached drawing.

*Example*

In this case, the desired, finished product was a test piece in the form of an alumina tube one inch long having an exterior diameter of 0.570" with a wall 0.075" in thickness. The ceramic mixture consisted principally of alumina containing about 2% $CaCO_3$ and a small amount of an organic binder such as zinc stearate, which is used in a conventional pottery making process. These materials, prior to mixing, are of a particle size small enough to pass through a 200 mesh screen.

After the mass has been made and tempered to the proper molding consistency, tubes of the required cross-sectional dimension were extruded and dried by exposing them to air at a temperature of about 200° C. for a few hours, after which sections one inch in length were cut off.

The next step in the process is enclosing or enveloping the dried compacts in a bath of molten aluminum. This can be done in various ways. In the case of objects of substantial size, it may be advisable to prepare a bath of molten aluminum heated to a temperature of about 700° C., and then lower the dried objects into the bath. However, in the case of the described tubular objects, which are only one inch in length, it has been found convenient to pack the green compacts in a graphite crucible containing chunks or particles of aluminum metal, and then raise the temperature of the crucible and its contents, so as to liquefy the aluminum. (Aluminum melts at a temperature of about 658° C.). It will be understood that in any case, the depth of the bath of molten aluminum is sufficient to effect a complete immersion of the objects to be sintered.

The graphite crucible containing the molten aluminum bath and the objects to be sintered was further heated in an oven. The air was preferably removed from the oven and replaced by an inert gas such as argon. The temperature of the bath was raised to 1340° C., which temperature was maintained for about eight hours. At the end of this period, the temperature of the bath was reduced to a point substantially below the temperature at which sintering had been effected. The sections were then withdrawn from the bath.

After the sections had been cooled, any skin or deposit of aluminum on the surface of the objects was then removed by dissolving the same in HCl.

Measuring tests made on these sections before and after the foregoing sintering step did not disclose any measurement or shape differences which could be detected by means of the usual measuring instruments such as scales or micrometers. On the other hand, in the case of sections made from the same batch of green, extruded tubing, and sintered at the same temperature, and for the same period, in a conventional kiln in the presence of air, the dimensional changes were so great as to cause shrinkage of 11% in linear dimensions, accompanied by a decrease of about 6% in weight.

Although compacts fired by the conventional process lost about 6% in weight during the air kiln sintering step, the sections after the liquid bath sintering step were found to weigh, in some cases, as much as 9% more than they did just prior to their immersion in the bath. This increase in weight which, in the particular case cited, was not objectionable from the standpoint of the practical use of the product, is believed to be due to the fact that these tube sections, because of their relative thinness, had a relatively large area exposed to the bath, resulting in some absorption and retention of aluminum metal within the pores of the objects.

Objects fired in the liquid metal bath do not appear to have as high a crushing strength as in the case of those which are fired in an air kiln by the conventional process. If a higher crushing strength is important, this may be secured by subjecting the bath-fired objects to a second firing in a conventional air-kiln for about eight hours at a temperature of about 1340° C. That the first sintering operation in the bath stabilizes the shape and dimensions of the objects permanently, is shown by the fact that the second firing in an air kiln results in no preceptible change in the shape or dimensions of the objects.

It is believed that where matters of cost and time are of importance, the bath process has advantages over the air kiln sintering method on account of the fact that aluminum is an excellent conductor of heat and in addition, being a metal, it can become heated by conduction and can efficiently transmit its heat rapidly and uniformly to the objects to be sintered.

The invention is of great value in connection with the production of objects or structures used in the fields of nuclear physics or plastics, e.g., small or large tubes of a cylindrical or toroidal shape. However, it can be employed in producing many other sizes and shapes of articles where accurate size and shape are required.

In the case of similar objects made from nominally pure alumina (100% $Al_2O_3$, without any other fluxing ingredient such as $CaCO_3$), with a small amount of organic binder, the results obtained, although comparable with those obtained in the foregoing example, were, in with those obtained in the foregoing example, were, in some instances, different. For instance, when the pieces were fired in air, the length decreased about 5%, and when initially fired in molten aluminum, the pieces increased about 2½% in diameter and in length, but the crushing strength was low. However, the crushing strength was raised to about 19,000 lbs. per square inch by subsequently giving these objects a second firing in an atmosphere of $H_2$ for a period of about 6 hours at 1700° C. However, this crushing strength was not obtained when the second firing was in air at a temperature of 1340° C., unless the air firing step was followed by the firing in hydrogen, as above described.

The use of the invention is not confined to the specific examples herein described in detail. For example, the ceramic mixture can contain such other materials as silicates or other compounds of aluminum, magnesium, beryllium, zirconium, or other metals, which compounds are capable of being finely ground, compacted and sintered. Also, liquid baths of other metals or of other materials such as fusible salts, may be employed provided that they are relatively stable at the sintering temperature and do not react with the materials of the ceramic mixture.

Certain features of the sintering method herein described may be employed in the manufacture of bodies containing a substantial percentage of such metals as beryllium or zirconium, or any other metal which can be sintered at a temperature lower than the normal melting point of the metal, but which, at the sintering temperature, will not form an alloy with the material of the bath of aluminum or other substance which is fluid at the sintering temperature.

Compacts made from powdered metal or metals of the character described may be made in the same manner as the compacts described in the foregoing example. They are then sintered at a bath of metal such as aluminum substantially in the manner described. When sintered bodies are made in this manner, the bath will enter the pores of the mass, so that the sintered body will be ductile and can be mechanically worked into different shapes, or if desired, the bath metal may be removed with hydrochloric acid or other suitable solvent, or in any other conventional manner so as to leave a porous body of the wanted metal, e.g., beryllium or zirconium.

Various features of the invention believed to be new are set forth in the appended claims.

I claim:

1. A method of producing a fired ceramic object having prescribed linear dimensions and shape which comprises first preparing a plastic, ceramic mix, working a portion of the mix to form a compact having the prescribed dimensions and shape which are desired for the final product, then immersing the compact in a bath of molten metal having a specific gravity approximating that of the compact, said metal being inert to the material in said compact when the latter is heated to a sintering temperature in the bath, and keeping the compact in said bath for a sufficient length of time and at a high enough temperature to convert said compact into a sintered ceramic product having said prescribed dimensions and shape.

2. A method of producing a fired ceramic object having prescribed linear dimensions and shape which comprises first preparing a plastic, ceramic mix, working a portion of the mix to form a compact having the prescribed dimensions and shape which are desired for the final product, then immersing the compact in a bath of molten metal having a specific gravity approximating that of the compact, said metal being inert to the material in said compact when the latter is heated to a sintering temperature in the bath, and keeping the compact in said bath in a non-oxidizing atmosphere for a sufficient length of time and at a high enough temperature to convert said compact into a sintered ceramic product having said prescribed dimensions and shape.

3. A method of producing a fired ceramic object having prescribed linear dimensions and shape, which comprises first preparing a plastic, ceramic mix consisting principally of alumina, working a portion of the mix to form a compact having the prescribed dimensions and shape which are desired for the final product, then immersing the compact in a bath of molten metal having a specific gravity approximating that of the compact, said metal being inert to the material in said compact when the latter is heated to a sintering temperature in the bath, and keeping the compact in said bath for a sufficient length of time and at a high enough temperature to convert said compact into a sintered ceramic product having said prescribed dimensions and shape.

4. A method of producing a fired ceramic object having prescribed linear dimensions and shape which comprises first preparing a plastic, ceramic mix, working a portion of the mix to form a shaped object and drying the object to produce a compact having the prescribed dimensions and shape which are desired for the final product, then immersing the dried compact in a bath of molten metal having a specific gravity approximating that of the dried compact, said metal being inert to the material in said compact when the latter is heated to a sintering temperature in the bath, keeping the compact in said bath for a sufficient length of time and at a high enough temperature to convert said compact into a sintered ceramic product having said prescribed dimensions and shape, removing the sintered product from the molten metal bath, and then treating the product with a suitable acid to dissolve adherent metal.

5. A method of producing a fired ceramic object having prescribed linear dimensions and shape which comprises first preparing a plastic, ceramic mix consisting principally of alumina and about 2% of $CaCO_3$, working a portion of the mix to form a shaped object, and drying the object at a temperature of about 200° C. so as to produce a compact having the prescribed dimensions and shape which are desired for the final product and having a specific gravity of about 2.75, then immersing the dried compact in a bath of molten aluminum at a temperature of about 700° C. and keeping the compact in said bath for a sufficient length of time and at a temperature of approximately 1340° C. so as to convert said compact into a sintered ceramic product having said prescribed dimensions and shape.

References Cited in the file of this patent

UNITED STATES PATENTS 2,352,246     Benner et al. _____ June 27, 1944

FOREIGN PATENTS 711,913     Great Britain _____ July 14, 1954